(12) United States Patent
Clark et al.

(10) Patent No.: US 7,774,645 B1
(45) Date of Patent: Aug. 10, 2010

(54) TECHNIQUES FOR MIRRORING DATA WITHIN A SHARED VIRTUAL MEMORY SYSTEM

(75) Inventors: Roy Clark, Hopkinton, MA (US); David W. DesRoches, Methuen, MA (US)

(73) Assignee: EMC Corporation, Hopkinton, MA (US)

( * ) Notice: Subject to any disclaimer, the term of this patent is extended or adjusted under 35 U.S.C. 154(b) by 525 days.

(21) Appl. No.: 11/393,438

(22) Filed: Mar. 29, 2006

(51) Int. Cl.
G06F 11/00 (2006.01)
G06F 11/16 (2006.01)

(52) U.S. Cl. .............................. 714/12; 714/6; 714/11; 714/13; 714/15; 711/147

(58) Field of Classification Search ............ 714/6, 714/12, 15, 7, 8, 11, 13; 711/147, 148, 161, 711/162
See application file for complete search history.

(56) References Cited

U.S. PATENT DOCUMENTS

| 5,440,727 | A | * | 8/1995 | Bhide et al. ................. 711/117 |
| 5,953,742 | A | * | 9/1999 | Williams .................... 711/154 |
| 6,081,833 | A | * | 6/2000 | Okamoto et al. ............ 709/213 |
| 6,170,044 | B1 | * | 1/2001 | McLaughlin et al. ........ 711/162 |
| 6,671,786 | B2 | * | 12/2003 | Wang et al. ................ 711/162 |
| 6,813,522 | B1 | * | 11/2004 | Schwarm et al. ............... 700/5 |
| 7,275,028 | B2 | * | 9/2007 | Traut .......................... 703/23 |
| 2002/0013889 | A1 | | 1/2002 | Schuster et al. |
| 2005/0223271 | A1 | * | 10/2005 | Butterworth et al. .......... 714/6 |
| 2006/0059287 | A1 | * | 3/2006 | Rivard et al. ................ 710/300 |
| 2006/0117300 | A1 | * | 6/2006 | Puthukattukaran et al. .. 717/124 |
| 2006/0187739 | A1 | * | 8/2006 | Borkenhagen et al. . 365/230.05 |
| 2007/0260821 | A1 | | 11/2007 | Zeffer et al. |

OTHER PUBLICATIONS

Wikipedia's Page Table version from Mar. 26, 2006 http://en.wikipedia.org/w/index.php?title=Page_table&oldid=45601729.*
Method and Apparatus for Providing a shared Data Region using Shard Page Tables by Mangalat and Kumar European Patent Application Publication 0 871 128 A2.*
Method and Apparatus for Providing a shared Data Region using Shared Page Tables by Mangalat and Kumar European Patent Application Publication 0 871 128 A2 Published Oct. 14, 1998.*
Clark, Roy, et al., U.S. Appl. No. 11/393,063, filed Mar. 29, 2006, entitled "Implicit Locks in a Shared Virtual Memory System".
Clark, Roy, et al., U.S. Appl. No. 11/393,174, filed Mar. 29, 2006, entitled "Sub-Page-Granular Cache Coherency Using Shared Virtual Memory Mechanism".

* cited by examiner

Primary Examiner—Scott T Baderman
Assistant Examiner—Joseph Schell
(74) Attorney, Agent, or Firm—BainwoodHuang

(57) ABSTRACT

A technique protects shared data in a local device having local memory. The technique involves observing a page table entry (PTE) on the local device. The PTE is stored in a page table used for managing virtual to physical address translations, tracking page modifications and handling page faults between semiconductor memory and magnetic disk drive memory on the local device. The technique further involves leaving a mirroring routine inactive on the local device when the PTE indicates that shared data corresponding to the PTE has not been modified on the local device. The mirroring routine is configured to copy the shared data from the local memory to a remote device. The technique further involves activating the mirroring routine to mirror the shared data from the local memory to the remote device when the PTE indicates that shared data corresponding to the PTE has been modified on the local device.

22 Claims, 10 Drawing Sheets

TECHNIQUES FOR MIRRORING DATA WITHIN A SHARED VIRTUAL MEMORY SYSTEM

BACKGROUND

A shared memory system typically includes multiple processing nodes connected together by a communications medium (e.g., a bus, a network, etc.). Each processing node includes a processor and local memory. In general, a processor can access its local memory faster than non-local memory (i.e., the local memory of another processor). SMP (symmetric multiprocessing), ccNUMA (cache-coherent non-uniform memory access) and NUMA (non cache-coherent non-uniform memory access) are examples of conventional multiprocessor architectures which employ shared-memory schemes.

Applications that run on these shared memory systems typically deploy data structures within this shared memory to share access to the data with other application instances. Applications construct and employ their own locking mechanisms to prevent multiple application instances from concurrently accessing and modifying their shared data and thus destroying data integrity. Before accessing the shared data, the application would, in the traditional manner, first acquire the application-lock protecting access to the data, possibly waiting for the lock to be freed by some other application instance. After acquiring this application-lock, the application could then access the shared data.

By way of example, on one traditional NUMA system, an application running on a first node could have an application-lock located in a shared page residing in the local memory of a second node. As a side effect of the application requesting this remote application-lock, the NUMA system's coherency mechanism on the processor of the first node sends a message through the communications medium of the system to the second node, requesting the subsystem page-lock on the page containing the application-lock. The processor of the second node responds to the message by acquiring the subsystem page-lock on behalf of the first node and notifying the first node that the page is locked. The processor of the first node then sends a message to the second node requesting the locked page, and the second node responds by providing the locked page to the first node through the communications medium. The processor of the first node then attempts to acquire the application-lock within that page. Once the application-lock is acquired, the processor of the first node sends the newly modified page back to the second node through the communications medium.

Eventually, the application explicitly releases the application-lock in the traditional manner. Additionally, the program provides a second explicit unlock instruction to the locking subsystem directing the locking subsystem to release the page-lock. In response, the locking subsystem clears the central locking data structure, thus enabling other nodes to acquire the page-lock in a similar manner.

It should be understood that the nodes in the shared memory system employ a sophisticated locking subsystem to coordinate accesses among multiple nodes competing for access to the shared memory page. This locking subsystem, which is separate from other node subsystems such as the node's virtual memory (VM) subsystem and the application's locking logic, is an integral part of the of the shared memory coherence mechanism, and is page granular.

It should be further understood that, while the page is locked on behalf of the first node, only the first node has access to the page, and other nodes of the system are unable to modify the page. If another node wishes to modify the same page, that other node must wait until the page's lock is released (e.g., until the first node completes its modification of the page, returns the page to the second node, and relinquishes the page-lock).

Similarly, on one traditional ccNUMA system, an application running on a first node could have an application-lock located in a shared cache line residing in the local memory of a second node. As a side effect of the application requesting this application-lock, the cache coherency mechanism in the first and second nodes enable coherent access to the shared cache line, which moves the cache line from the second node to the first node through the communications medium of the system. The processor of the first node then attempts to acquire the application-lock within the cache line.

It should be understood that the nodes in a ccNUMA system employ a sophisticated cache coherence subsystem to coordinate accesses among multiple nodes competing for access to the shared memory cache line. This subsystem is separate from other node subsystems such as the node's virtual memory (VM) subsystem and the application's locking logic.

Eventually the application explicitly releases the application-lock in the traditional manner.

SUMMARY

Unfortunately, there are deficiencies with the above-described conventional NUMA and ccNUMA approaches. For example, in the above-described conventional approaches, there is no conventional straightforward data protection mechanism which provides access to the shared data in the event of a failure of the processing node currently holding the shared data. Accordingly, a failure of that node results in the shared data becoming unavailable until the failed node is repaired or perhaps results in the data being permanently lost even after the failed node is repaired.

Moreover, in certain conventional highly available systems, the system platform and/or the operating systems and the application environments algorithmically maintain memory consistency. Typically, such systems employ dedicated and elaborate schemes which create replicate copies in different fault domains. Following a failure in one fault domain, processing may resume in a surviving fault domain because all of the shared data is still present due to replication.

In contrast to the above-described conventional approaches which either have no conventional straightforward data protection mechanism or which create replicate copies in multiple fault domains, an improved technique protects shared data by mirroring modified shared data. In particular, when a page table entry on a local computerized device indicates that shared data corresponding to the page table entry has been modified, the local computerized device is capable of activating a data mirror routine to mirror the shared data from local physical memory on the local computerized device to a remote computerized device (e.g., a predefined mirroring device). The modify bit in a page table entry is automatically set by a computerized device when data is modified within the corresponding local memory page in a conventional system. Accordingly, if the local computerized device were to subsequently fail, the shared data is capable of being accessed from the remote computerized device. Such operation provides availability of the shared data in a simple and straightforward manner (e.g., in response to detection of a modified bit being set within the page table entry) but does not require dedicated and elaborate schemes to create replicate copies in different fault domains.

One embodiment is directed to a method for protecting shared data in a local computerized device having local physical memory. The method includes observing a page table entry on the local computerized device. The page table entry is stored in a page table used for managing virtual to physical address translations, tracking page modifications and handling page faults between semiconductor memory and magnetic disk drive memory on the local computerized device. The method further includes leaving a data mirror routine inactive on the local computerized device when the page table entry indicates that shared data corresponding to the page table entry has not been modified on the local computerized device. The data mirror routine is configured to copy the shared data from the local physical memory to a remote computerized device. The method further includes activating the data mirror routine to mirror the shared data from the local physical memory to the remote computerized device when the page table entry indicates that shared data corresponding to the page table entry has been modified on the local computerized device. Such an embodiment is capable of being easily implemented as an extension to a mechanism which coordinates access to shared data among multiple computerized devices using page table entries.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved technique protects shared data by mirroring modified shared data. In particular, when a page table entry on a local computerized device indicates that shared data corresponding to the page table entry has been modified, the local computerized device is capable of activating a data mirror routine to mirror the shared data from local physical memory on the local computerized device to a remote computerized device (e.g., a pre-defined mirroring device). Accordingly, if the local computerized device were to subsequently fail, the shared data is capable of being accessed from the remote computerized device. Such operation provides availability of the shared data in a simple and straightforward manner (e.g., in response to detection of a modified bit being set within the page table entry) but does not require dedicated and elaborate schemes to create replicate copies in different fault domains.

Figure 1:
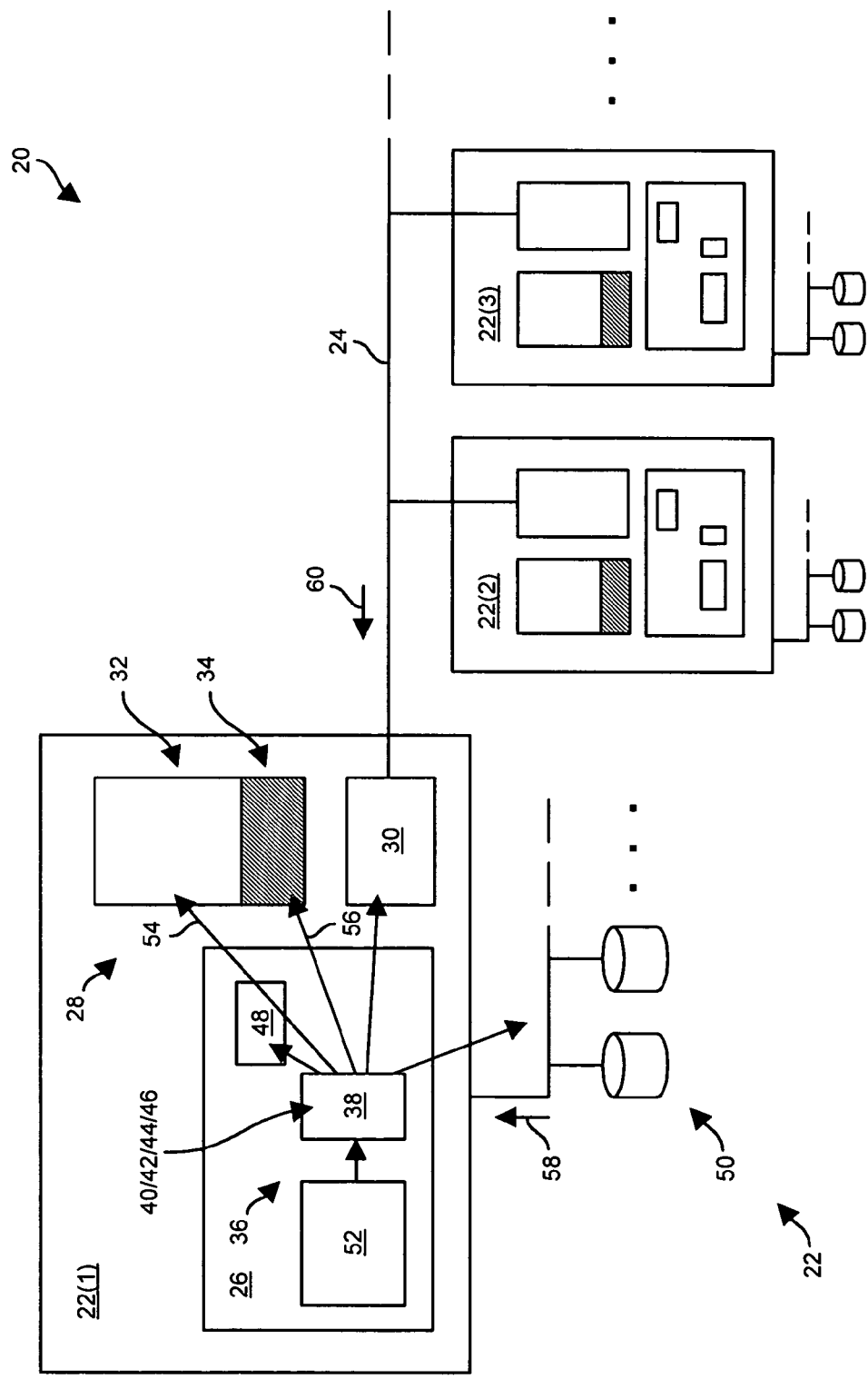
FIG. 1 is a block diagram of a shared-memory system which is configured to provide access to shared data based on enhanced standard virtual memory mechanisms.

FIG. 1 shows a shared memory system 20 which is configured to provide access to shared data based on enhanced standard virtual memory mechanisms which employ implicit locks. The shared memory system 20 includes multiple computerized devices 22(1), 22(2), 22(3), ... (collectively, computerized devices 22), and a communications medium 24 which connects the computerized devices 22 to each other as nodes of the system 20. The computerized device 22(1) is shown larger than the other computerized devices 22 in order to better illustrate particular details of each computerized device 22.

As shown best by the computerized device 22(1) in FIG. 1, each computerized device 22 has a controller 26, physical memory 28 (i.e., electronic semiconductor memory) and an interface to an internodal communication medium 30 (e.g., a host channel adapter or HCA). The physical memory 28 of each computerized device 22 is partitioned into an ordinary portion 32 and a specialized shared portion 34 (shaded). This specialized shared portion 34 is located at the same address and is of the same size on each computerized device 22 in the system 20. Furthermore, the physical memory 28 of the computerized device 22(1) is considered "local" (i.e., local memory) to the computerized device 22(1) but "remote" (i.e., remote memory) to the other computerized devices 22(2), 22(3), ... of the system 20. Similarly, the physical memory of the computerized device 22(2) is considered local to the computerized device 22(2) but remote to the other computerized devices 22(1), 22(3), ..., and so on.

As further shown by the computerized device 22(1) in FIG. 1, the controller 26 of each computerized device 22 includes processing circuitry 36 (e.g., a CPU, a microprocessor, a processor chipset, etc.) which is configured for virtual memory (VM) addressing in both the traditional sense as well as an improved manner. Along these lines, the processing circuitry 36 employs a set of VM-related components 38 including a TLB 40, a page table 42 having page table entries 44 (PTEs), a page fault handler 46, etc. to provide VM-to-physical address mapping and translation. Accordingly, there is processor-supplied coherency between caches 48 (e.g., an L1 and an L2 cache) and the entire range of the physical memory 28. For simplicity, the TLB 40, the page table 42 having the PTEs 44, and the page fault handler 46 are shown generally by the reference numerals 40, 42, 44, and 46, respectively, in FIG. 1. Also for simplicity, the VM process, which allows for execution of applications 52 whose range of memory accesses exceed the size of the internal cache 48 and the available physical memory 28, is illustrated by the arrows leading toward and away from the set of VM-related components 38 in FIG. 1.

It should be understood that the page fault handler 46 of each device 22 includes enhancements that enable robust and reliable mapping and translation of not only a local virtual memory address range 54 (illustrated by the arrow 54 in FIG. 1), but also a shared virtual memory address range 56 (illustrated by the arrow 56 in FIG. 1) to the physical memory 28. In particular, in the event of a page fault on the local VM range 54, the page fault handler 46 coordinates transfer of data 58 into the ordinary portion 32 of local physical memory 28 from the magnetic disk drives 50 in a conventional manner. However, in the event of a page fault on the shared VM range 56, the page fault handler 46 coordinates transfer of shared data 60 into the specialized shared portion 34 of local physical memory 28 from another computerized device 22 (e.g., transfer into the physical memory 28 of the device 22(1) from the device 22(2)). Since the enhancements to the page fault handler 46 are software-based, the page fault handler 46 is more flexible than a rigid hardware implementation (i.e., the handler 46 is easily upgradeable).

It should be further understood that communications between the devices 22 during the transfer of shared data through the communications medium 24 preferably utilizes built-in support for masked atomic compare-and-swap (MACS) and remote direct memory access (RDMA) operations provided by a standard communications protocol. Such leveraging of off-the-shelf functionality for this enhanced operation alleviates the need to independently design and implement these features. InfiniBand and Rapid IO are examples of two communications protocols which are well-suited for providing MACS and RDMA support. Further details will now be provided with reference to FIG. 2.

Figure 2:
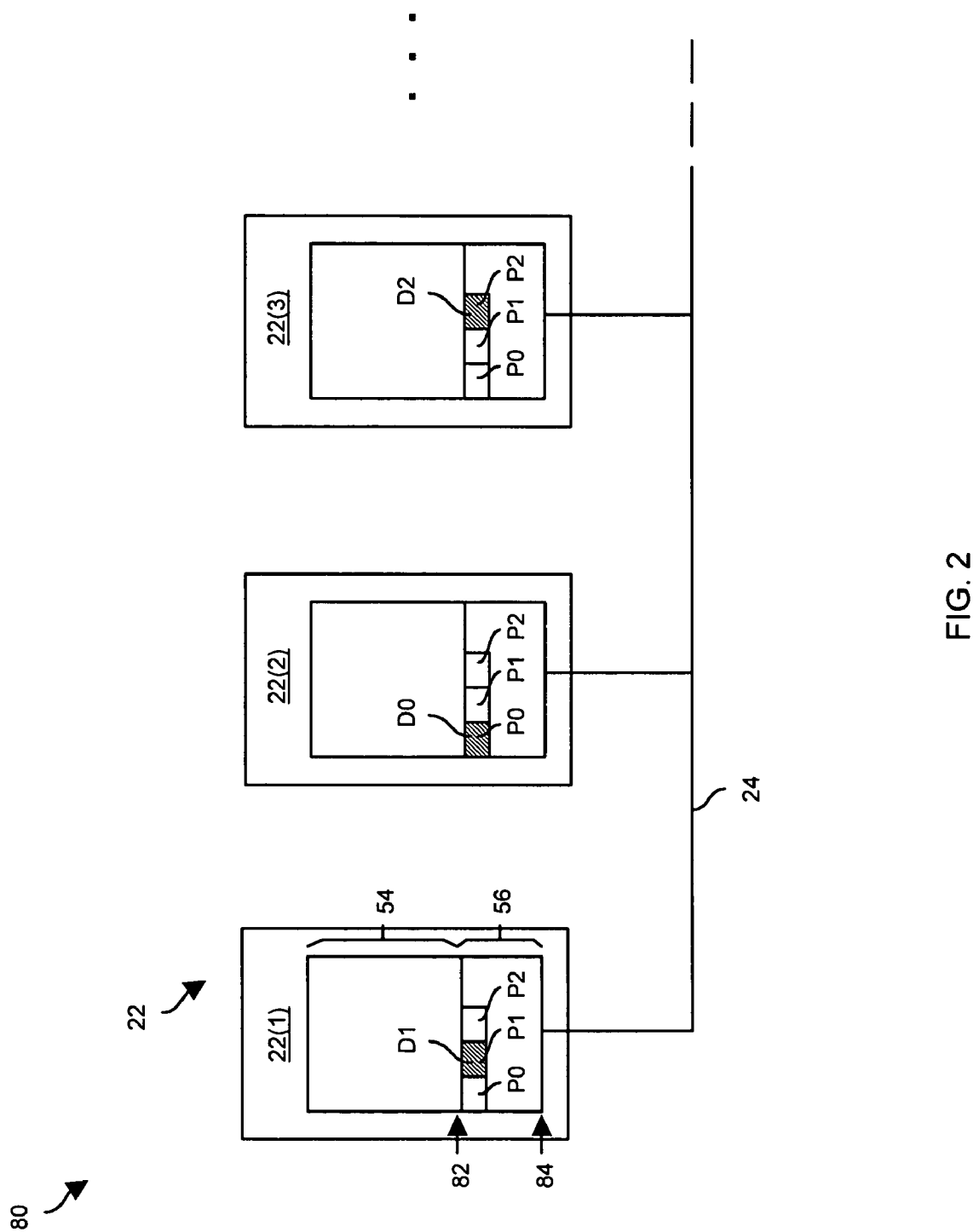
FIG. 2 is a block diagram of a distributed shared memory address layout for the system of FIG. 1.

FIG. 2 is a block diagram of a distributed shared virtual memory address (DSM) layout 80 for the shared memory system 20. Recall that the local VM range 54 maps virtual addresses to the internal cache 48 and the ordinary portion 32 of physical memory 28, and the shared VM range 56 maps virtual addresses to the internal cache 48 and the specialized shared portion 34 of physical memory 28 (also see FIG. 1). Although these virtual memory ranges 54, 56 are not necessarily shown in proper proportion to each other in FIG. 2 or in proportion to physical memory 28 in FIG. 1 (i.e., the shared virtual address range 56 can be much smaller than the local virtual address range 54 and virtual memory ranges 54, 56 can be much larger than physical memory 28), the starting address 82 and ending address 84 forming the shared VM range 56 are the same (i.e., the virtual addresses 82, 84 are replicated) on each computerized device 22 as shown in FIG. 2. Accordingly, the physically addressed pages P0, P1, P2, ... of the specialized shared portion 34 of physical memory 28 (collectively, shared pages P) have the same physical addresses on each device 22, and the DSM layout 80 operates as an N-way mirror (N being the number of devices 22 in the system 20).

However, the actual shared data D0, D1, D2, ... (i.e., the contents of the shared pages P) is not necessarily replicated on each computerized device 22. Rather, the actual shared data simply resides on the device 22 that last accessed it. By way of example, the device 22(1) is shown as having actual data D1 (shaded) because device 22(1) is the last device to access the data D1. Similarly, the device 22(2) is shown as having actual data D0 (shaded) because device 22(2) is the last device to access the data D0. Additionally, the device 22(3) is shown as having actual data D2 (shaded) because device 22(3) is the last device to access the data D2, and so on. Further details will now be provided with reference to FIG. 3.

Figure 3:
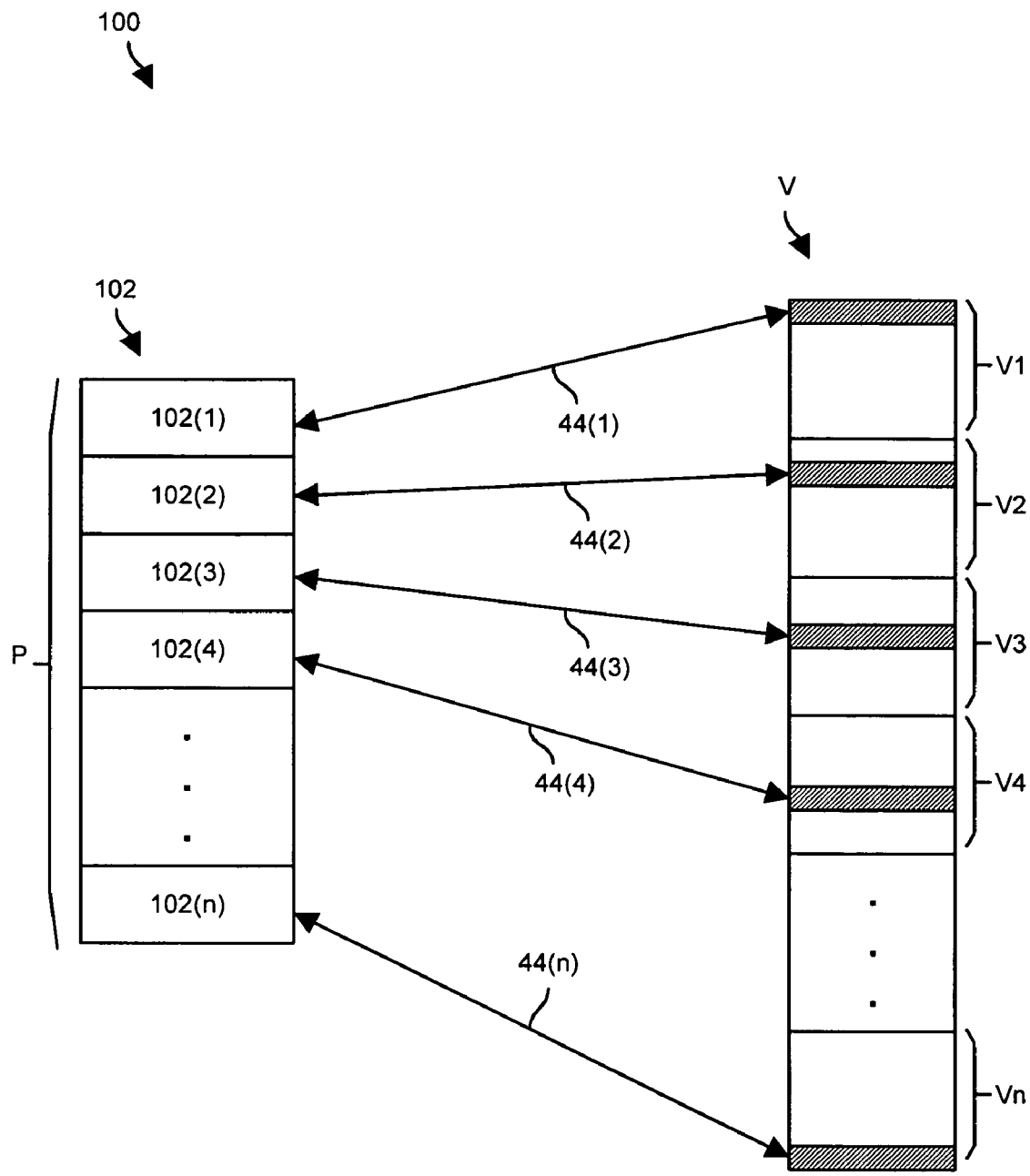
FIG. 3 is a block diagram of an address mapping scheme employed by the system of FIG. 1.

FIG. 3 is a block diagram 100 of a virtual to physical address mapping scheme employed by the system 20. As shown in FIG. 3, each physical page P of the specialized shared portion 34 of physical memory 28 is divided into a series of contiguous equal-sized physical "extents" (or sections of memory) 102. The size of an extent 102 is established based on the particular application and the size of the CPU's cache line, and establishes the granularity of the shared data. By way of example, if the application requires sharing 120 byte chunks of data (see the application 52 running on the controller 26 in FIG. 1), 128 bytes is a well-suited size for the coherence granule because 128 bytes is both (i) large enough to hold 120 bytes and (ii) a multiple of the cache line size of the controller 26. N extents 102 are shown as belonging to the physical page P in FIG. 3.

As shown in FIG. 3, the extents 102(1), 102(2), 102(3), 102(4), ..., 102(n) of the specialized shared portion 34 of physical memory 28 map to sparse virtual pages V1, V2, V3, V4, ..., Vn (collectively, virtual pages V) via page table entries 44(1), 44(2), 44(3), 44(4), ... 44(n) (collectively, PTEs 44), respectively. In particular, the extents 102 coexist on the same physical page P in the physical memory 28 of each device 22. However, each extent 102 maps in a 1-to-1 manner to a separate virtual page V, and maintains its predefined offset (i.e., address offset from the beginning of the virtual page) on both the physical page P and the corresponding virtual page V.

Moreover, each sparse virtual page Vp has a designated "home" device 22 which maintains the ownership metadata for Vp and which remains static during operation of the system 20, as well as a current "owner" device 22 which is dynamic during operation of the system 20. In particular, at an initial configuration time which is prior to operation of the system 20, configuration software logic can predefine the computerized device 22(1) as the home of the sparse virtual page V1 (and thus the extent 102(1)). Similarly, the configuration software logic can predefine the computerized device 22(2) as the home of the sparse virtual page V2 (and thus the extent 102(2)), and so on. Once the system 20 is in operation, the device 22 that is currently accessing a sparse virtual page Vp or that accessed the sparse virtual page Vp most recently, is deemed the current owner of that virtual page Vp. Since the originally predefined homes of the sparse virtual pages Vp do not change while the system 20 is in operation, the current owner of each sparse virtual page Vp may be different than the home of that virtual page Vp.

It should be understood that the above-described mapping of each virtual page Vp to a single extent 102 enables simple utilization of the same traditional VM mechanism (i.e., the page table 42, the page fault handler 48, etc.) as that used for maintaining coherence of the ordinary portion 32 of physical memory 28 (also see FIG. 1). That is, the extents 102 leverage the VM page-centric support of the VM-related components 38 within the controller 26 (i.e., the PTEs 44, the TLB 40, etc.). The double-arrowed reference lines in FIG. 3 illustrate the 1-to-1 mapping relationship between the extents 102 and the sparse virtual pages Vp provided by particular PTEs 44 which, as mentioned earlier, statically provide such mapping throughout operation of the devices 22. Along these lines, on each device 22, the valid bit (V) of each PTE 44 corresponding to an extent 102 indicates whether that device 22 both currently owns the corresponding extent 102, and, has it locked for exclusive access. While this valid bit (V) is set, no other device 22 can access or become the current owner of the extent 102. Once the device 22 completes its accesses to extent 102, it resets this valid bit (V). Any subsequent access by this device 22 to the extent 102 will generate a page fault, and the page fault handler on the device 22 will need to determine if this device 22 is, or is not, the current owner by examining the PTE 44 contents. If the contents refer to this device 22, then this device is still the current owner and the page fault handler may set the PTE's 44 valid bit (V). Otherwise, this device 22 can send a request to the home node of the extent 102 to find out which device 22 currently owns the extent 102. To this end, on the home node, a field in the PTE 44 for the extent 102 contains metadata identifying which device 22 is the current owner of the extent 102. Accordingly, and as will be described in further detail below, the system 20 is well-equipped to respond to a single page-fault on the shared address range 56 by bringing shared data for an extent 102 into local physical memory 28 from remote physical memory 28 in a manner similar to faulting in a page from secondary memory. Further details will now be provided with reference to FIGS. 4-7.

FIGS. 4-7 show various phases of a shared memory access operation performed by an example configuration 200 for the system 20 when shared data must be faulted into a device 22 remotely from another device 22 through the communications medium 24. As shown in each of FIGS. 4-7 and for illustration purposes, there are three nodes in the system 20: computerized devices 22(A), 22(B) and 22(C). The shared virtual memory mechanisms within each device 22 (i.e., the VM-related components 38, also see FIG. 1) reliably coordinate access to shared data as will now be explained in further detail with reference to the following example.

Suppose that the device 22(B) is the predefined home for a particular extent Z. Additionally, suppose that the device 22(C) is the current owner of the extent Z (i.e., the device 22(C) that last accessed the extent Z). Furthermore, suppose that an application 52 (also see FIG. 1) running on the device 22(A) provides an instruction with a shared virtual memory (SVM) address X that requires access to data within the extent Z.

Figure 4:
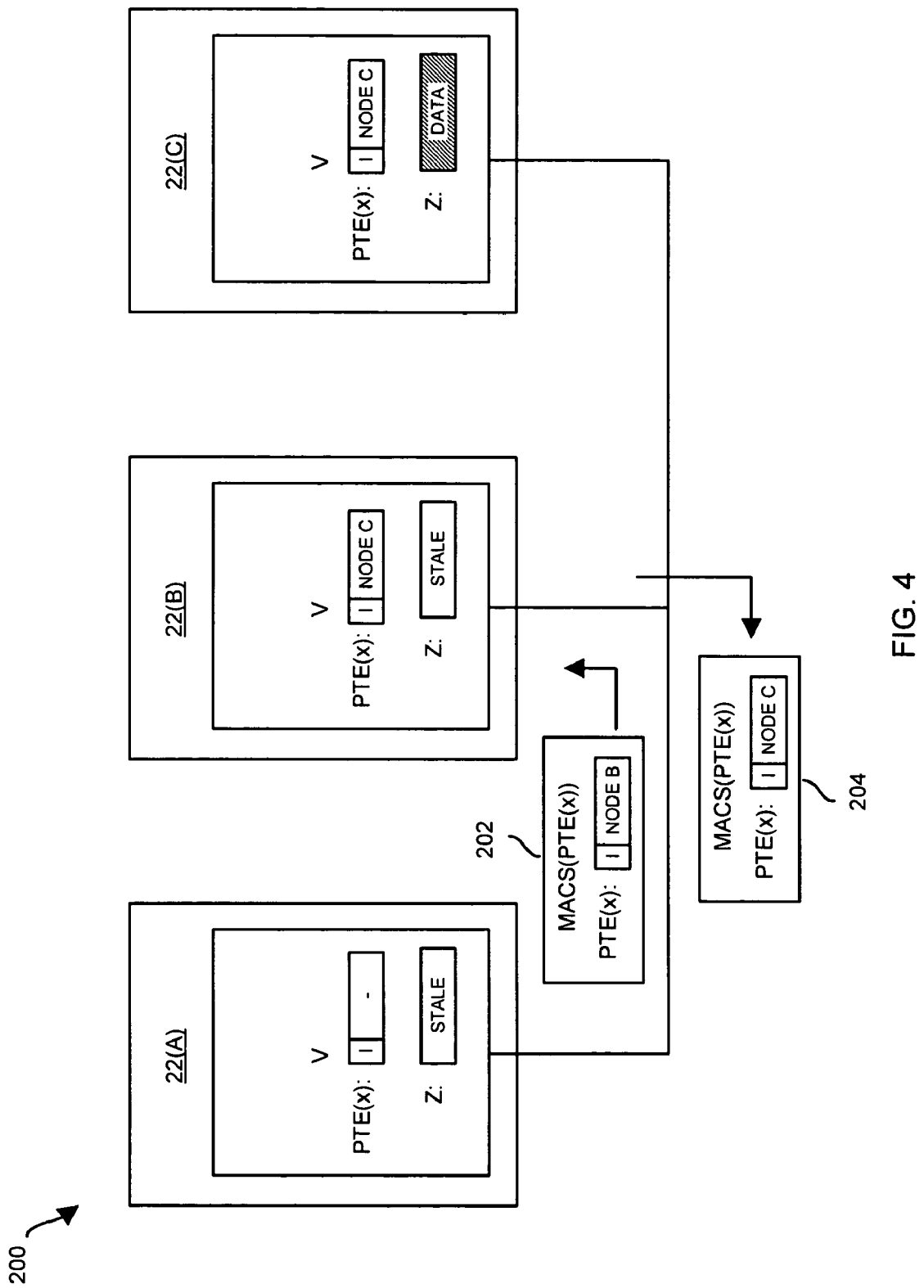
FIG. 4 is a block diagram of the system of FIG. 1 during a first phase of an exemplary shared memory access operation.

The state of the system 20 at this point is shown in FIG. 4. In particular, in the device 22(A), the page table entry PTE(x) to the sparse virtual page Vx is invalid (i.e., the valid bit V is set to "I"), and the PTE's contents are nil, (since the device 22(A) is not the current owner of the extent Z) and the contents within the extent Z of the physical memory 28 are stale (since the device 22(A) was not the device 22 to most recently access the extent Z). Similarly, in the device 22(B), the page table entry PTE(x) to the sparse virtual page Vx is also invalid (i.e., device 22(B) is not currently accessing extent Z), and the contents of PTE(x) does not identify this device 22(B), so the contents within the extent Z of the physical memory 28 are also stale (the device 22(B) was not the device 22 to most recently access the extent Z). Nevertheless, since device 22(B) is the predefined home node for the extent Z, a field of the page table entry PTE(x) contains an identifier for device 22(C) which is the current owner of the extent Z. That is, the metadata within PTE(x) on device 22(B) (i.e., the home node for extent Z) identifies the current owner for extent Z.

In connection with device 22(C), the page table entry PTE (x) corresponding to the sparse virtual page Vx is also invalid since the device 22(C) has recently relinquished exclusive access to the extent Z, but the data resides within the extent Z of the physical memory 28. Accordingly, in device 22(C), a field of the page table entry PTE(x) contains an identifier for device 22(C) thus further indicating that device 22(C) is the current owner of the extent Z. Further details of how the system 20 provides access to the data in extent Z to device 22(A) will now be provided.

As shown in FIG. 4, in order for the device 22(A) to find out which device 22 is the current owner of the extent Z and thus which device 22 holds the actual data, the device 22(A) sends an owner request 202 to the home node of the extent Z. Since the home node for the extent Z was predefined prior to operation of the system 20 to be device 22(B) (e.g., algorithmically determined by the page fault handler 46, also see FIG. 1), the device 22(A) knows to send the owner request 202 to the device 22(B). By way of example, the device 22(A) prepares and sends this owner request 202 to the device 22(B) (i.e., the home of the extent Z) through the communications medium 24 as a PTE MACS operation on PTE(x).

As further shown in FIG. 4, the device 22(B) responds to the owner request 202 by performing the MACS operation on the PTE for SVM address X. The masked-compare portion of the MACS operation determines that there is not a match between the data in the MACS request and the PTE, so the swap portion of the MACS operation is not performed. The device 22(B) then returns an owner response 204 having the MACS result (i.e., a copy of its PTE for X) to the device 22(A) through the communications medium 24. Recall that the PTE for X in the device 22(B) includes metadata that identifies the current owner of the extent Z, i.e., device 22(C).

Figure 5:
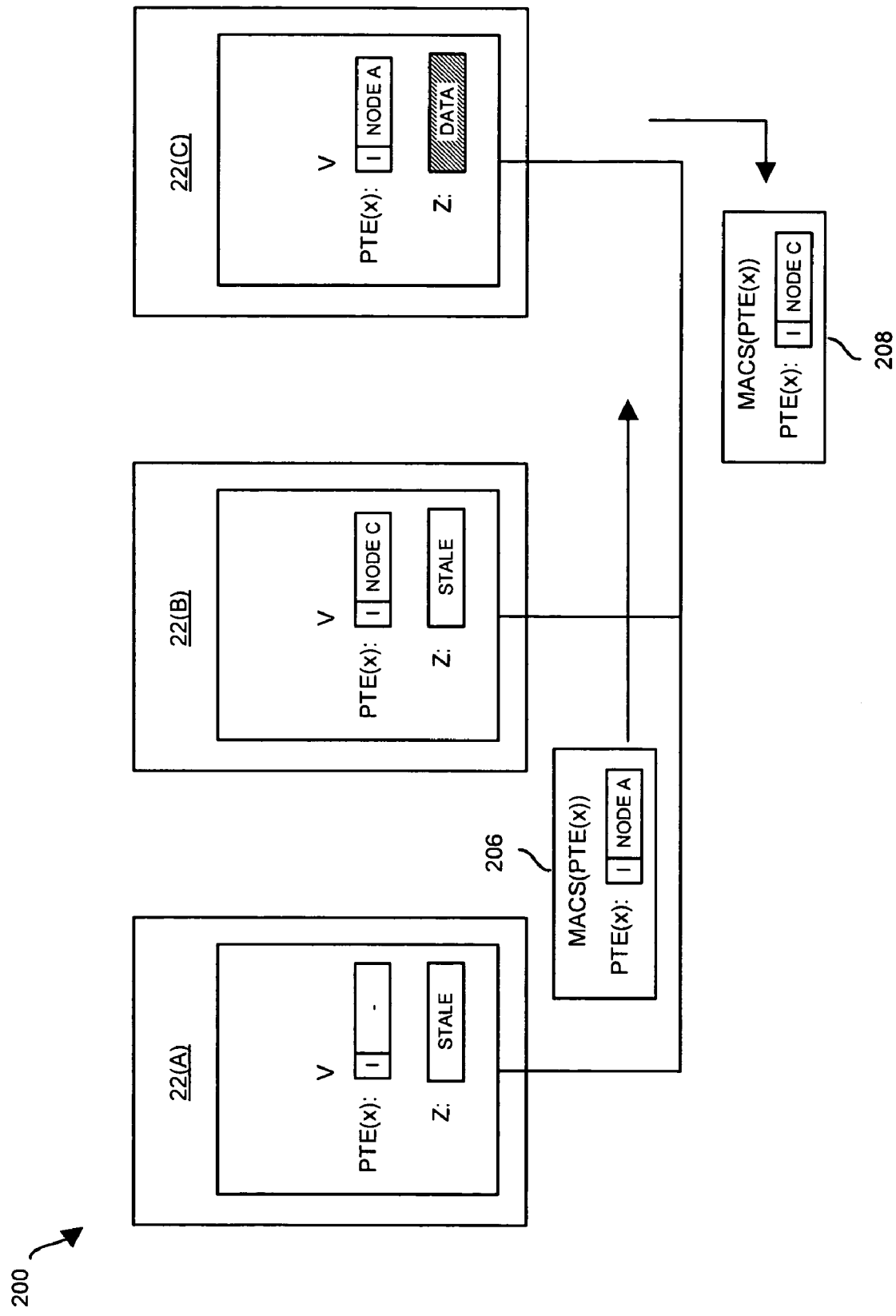
FIG. 5 is a block diagram of the system of FIG. 1 during a second phase of the shared memory access operation.

As shown in FIG. 5, upon receipt of the owner response 204, the device 22(A) checks the MACS result and finds metadata identifying device 22(C) as the current owner of the extent Z. Accordingly, the device 22(A) now expects that the up-to-date data is in extent Z within device 22(C). In response, the device 22(A) generates a data request 206, and sends that data request 206 to the device 22(C) through the communications medium 24. The data request 206 includes metadata identifying device 22(A) as a device 22 wishing to access the extent Z. Again the request 206 takes the form of a PTE MACS operation on PTE(x).

In response to the data request 206 from the device 22(A), the device 22(C) performs the masked-compare portion of the MACS operation. The masked-compare portion of the MACS operation determines that there is a match between the data in the MACS request and the PTE, so the swap portion of the MACS operation is performed. As a result, the PTE for X in the device 22(C) is written with metadata identifying the device 22(A) as the current owner, and the response 208 includes the original PTE for X from the device 22(C) with metadata identifying device 22(C) as the previous owner and that extent Z is not currently in use, as further shown in FIG. 5. Note that in the event the masked-compare portion of the MACS fails because the valid bit (V) in its PTE is currently set, this indicates that the device 22(C) knows that it is currently accessing the extent Z, and thus maintains the PTE for X in its current state (i.e., the metadata would still identify device 22(C)) and sends back a response 208 (e.g., a copy of the PTE for X with the valid bit V set to "V" for valid) indicating that the extent Z is currently in use. Further note that in the event the masked-compare portion of the MACS fails because some other portion of the data in the MACS request mis-compares, this indicates that the device 22(C) no longer is the owner of extent Z, and thus maintains the PTE for X in its current state and sends back a response 208 (e.g., a copy of the PTE for X) indicating that the device 22(C) is no longer the owner of extent Z.

Figure 6:
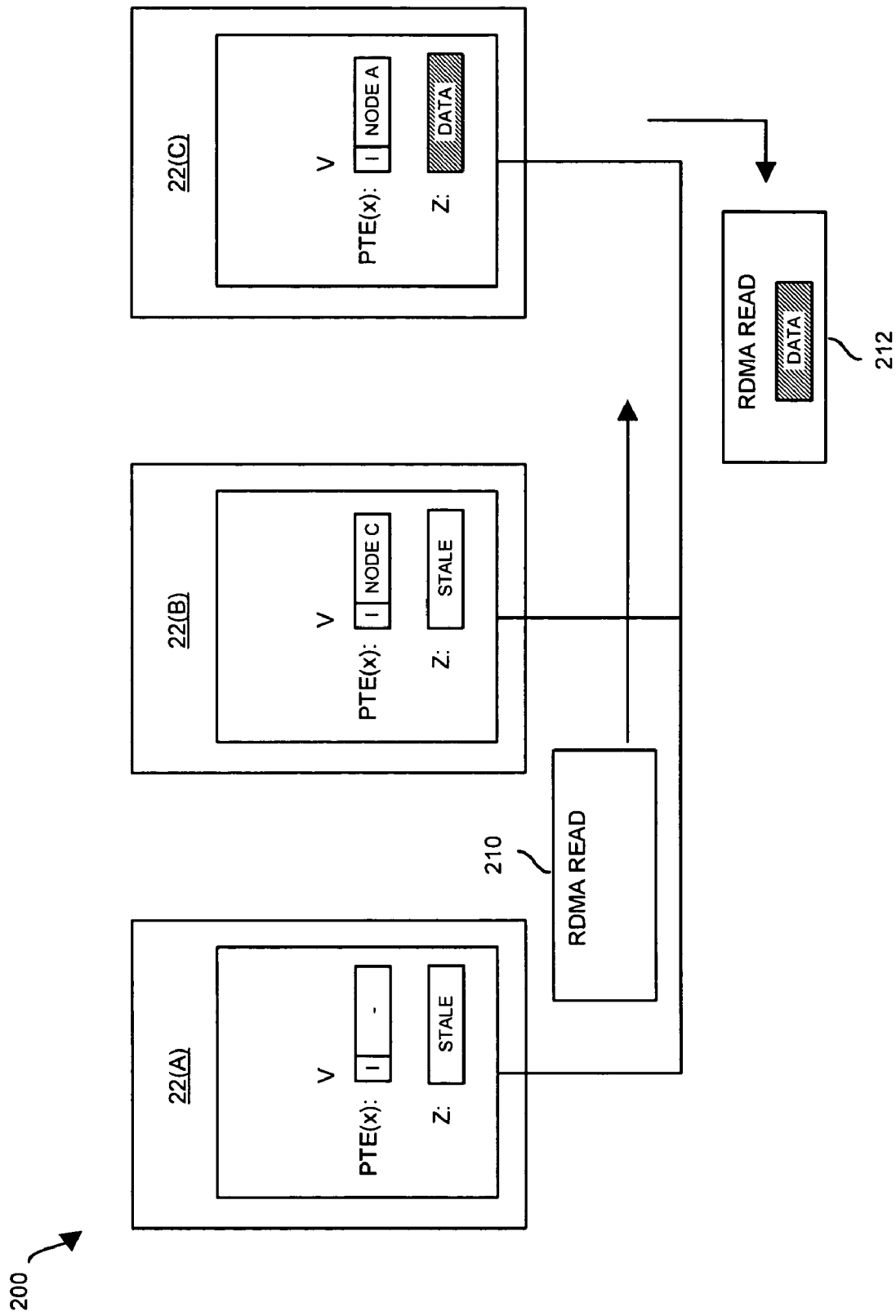
FIG. 6 is a block diagram of the system of FIG. 1 during a third phase of the shared memory access operation.

When the device 22(A) receives a response 208 having the valid bit (V) not set, and metadata identifying device 22(C) as the previous owner, the device 22(A) concludes that the extent Z is available from device 22(C) and that device (C) relinquishes ownership of the extent Z. Accordingly, the device 22(A) generates and sends a data transfer instruction 210 (e.g., an RDMA read instruction) to the device 22(C) through the communications medium 24, as shown in FIG. 6. Upon receipt of the data transfer instruction 210, the device 22(C) provides a reply 212 containing the contents of the extent Z to the device 22(A) through the communications medium 24, as further shown in FIG. 6. The size of the reply 212 needs to be only slightly larger than the extent granularity (e.g., to frame the shared data) thus keeping data transfer latency to a minimum.

Figure 7:
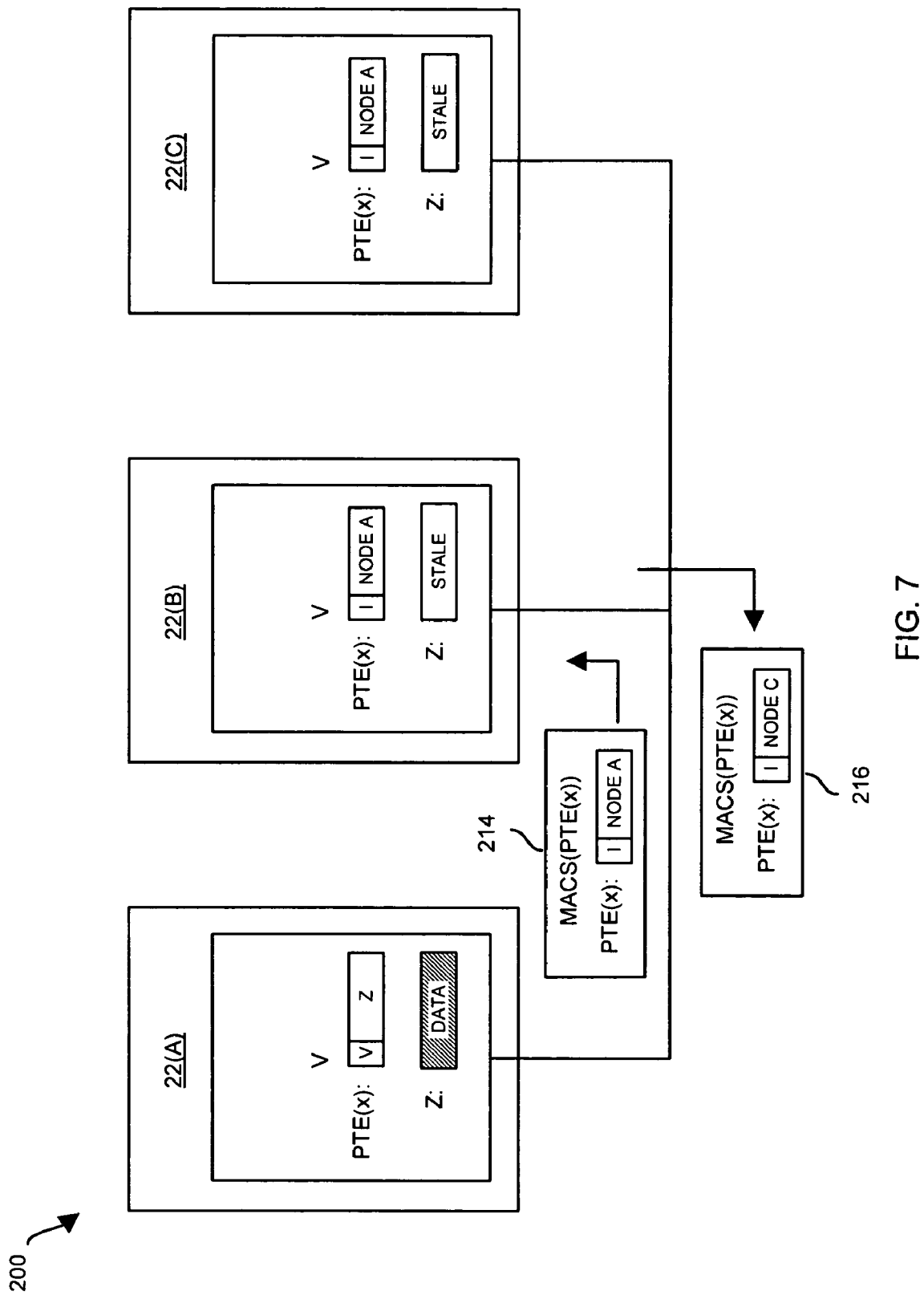
FIG. 7 is a block diagram of the system of FIG. 1 during a fourth phase of the shared memory access operation.

Upon receipt of the reply 212, the device 22(A) places the data into the extent Z in the local physical memory 28, updates its PTE for X by setting the valid bit (V) to indicate that the data in the extent Z is currently in use, and sets the metadata in the PTE for X to point to the extent Z as shown in FIG. 7. The device 22(A) then generates a message 214 with metadata identifying the device 22(A) as the current owner of the data in extent Z, and sends that message 214 to the home node for the extent Z, i.e., the device 22(B) as further shown in FIG. 7. The device 22(B) responds to the message 214 by performing another MACS operation that replaces the older metadata in the PTE for X with new metadata identifying device 22(A) as the new owner of the data in the extent Z and returns a reply 216 to the device 22(A) through the communications medium 24. The reply 216 contains the older metadata identifying the previous owner (i.e., device 22(C)) to allow the device 22(A) to confirm proper operation, as further shown in FIG. 7. At this point, the data is now available to the application 52 running in the device 22(A). Moreover, if another device 22 sends an owner request to the device 22(B) to find the location of the data for extent Z, the PTE for X within the device 22(B) now includes metadata identifying the device 22(A) as having that data and the data in extent Z of the device 22(C) is now stale.

It should be understood that the device 22(A) does not need to push the updated data in extent Z back to where the device 22(A) originally obtained the data (i.e., the device 22(A) does not need to send the revised data back to device 22(C) or the home device 22(B)). Rather, the computerized device 22(A) can enjoy local memory performance on subsequent shared memory accesses to extent Z. If another device 22 requires the data in extent Z, the other device 22 performs a sequence of exchanges similar to that described above and in connection with FIGS. 4-7.

It should be further understood that, after device 22(A) resets the valid bit (V) on the PTE for X to indicate extent Z is available to other devices 22, as long as the device 22(A) remains the device 22 that most recently owned the data in extent Z, the data in extent Z is not stale with the device 22(A) and thus can be re-accessed without any further communications with any of the other devices 22. In particular, upon a request for the data in extent Z by the application 52 running on the device 22(A), the standard VM mechanisms will discover the reset valid bit in the PTE and generate a page fault exception. The page fault handler 46 of the device 22(A) can examine the PTE for X and discover that since the metadata within the PTE identifies the device 22(A), the device 22(A) knows that it is the device 22 that most recently owned the extent Z and thus that the data within the extent Z is not stale. Accordingly, the device 22(A) can set the valid bit in the PTE for X and quickly access the contents of the extent Z, i.e., a quick re-hit.

Moreover, it should be further understood that there is only contention for the data in extent Z if another device 22 truly wants access to the data in extent Z. If another device 22 wants access to a different extent (e.g., another extent which closely neighbors extent Z within the same physical page P of the physical memory 28), the other device 22 nevertheless addresses a different virtual page Vy which corresponds to a different PTE due to the above-described sparse virtual paging scheme. As a result, the access attempt by the other device 22 will not necessarily interfere with the handling of extent Z by the device 22(A). That is, contention for data within each extent is minimized even though multiple extents reside within the same physical page P in physical memory 28. Further details will now be provided with reference to FIG. 8.

Figure 8:
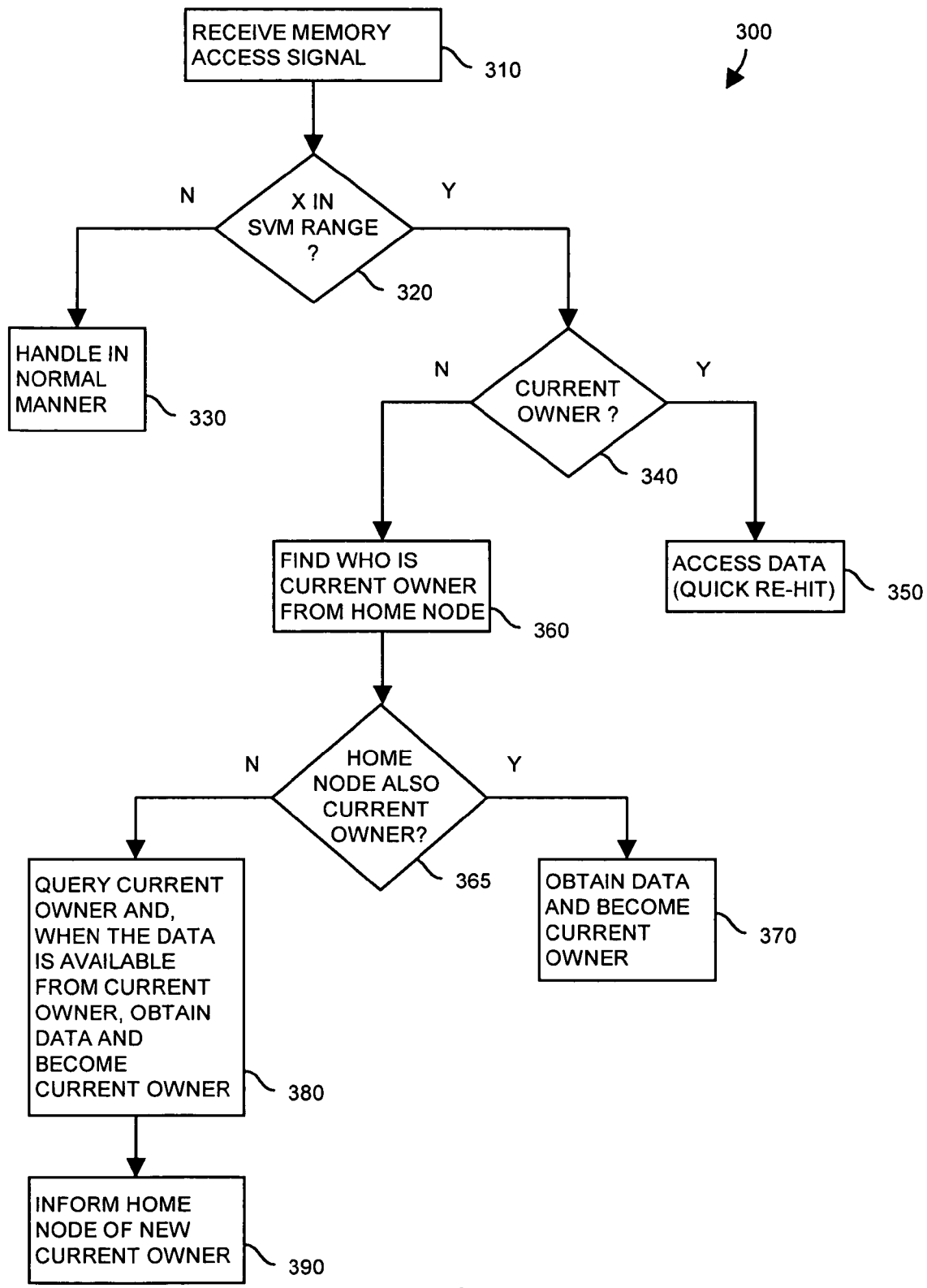
FIG. 8 is a flowchart of a procedure which is performed by a page fault handler of the system of FIG. 1.

FIG. 8 is a flowchart of a procedure 300 which is performed by the page fault handler 46 of each computerized device 22 of the system 20 along the lines described above when providing access to data. In step 310, the page fault handler 46 receives a memory access signal. In the context of FIGS. 4-7 above, the page fault handler 46 activates upon execution of an instruction referencing SVM address X (e.g., access(x)) where virtual page Vx is the virtual page to be accessed and the PTE for X is invalid. The page fault handler 46 then proceeds to step 320.

In step 320, the page fault handler 46 checks to see if virtual page Vx is within the ordinary address range 54 or the shared virtual memory range 56. That is, the handler 46 determines which type of page fault has occurred based on a comparison between the SVM address X and the local and shared virtual memory ranges 54, 56. If SVM address X is in the ordinary address range 54, the page fault handler 46 proceeds to step 330. Otherwise, if SVM address X is in the shared virtual memory range 56, the page fault handler 46 proceeds to step 340.

In step 330, the page fault handler 46 attends to the fault operation in a normal manner. In particular, the page fault handler 46 operates in a traditional page miss manner and thus provides reliable access to the data.

In step 340, when the SVM address X is in the shared virtual memory range 56, the page fault handler 46 knows that the SVM address X refers to a particular extent 102 within the shared memory range 34 of physical memory 28 (e.g., see extent Z in the earlier example of FIGS. 4-7). At this point, the page fault handler 46 determines whether the device 22 on which the handler 46 is running is the current owner of the particular extent 102 referenced by SVM address X. During this step, the page fault handler 46 inspects the metadata of the PTE(x). For example, if the handler 46 is running on device 22(A) and the metadata of PTE(x) indicates that the device 22(A) is the current owner (see FIG. 7), the device 22(A) knows that the data for extent Z is already in the local physical memory 28 of device 22(A). In this situation, when the data for the extent 102 is local, the page fault handler 46 proceeds to step 350. However, if the handler 46 is running on device 22(A) (see FIG. 4) and the metadata of PTE(x) does not indicate that the device 22(A) is the current owner, the device 22(A) knows that it must obtain the data for extent 102 from another device 22. In this situation, when the data for the particular extent 102 is remote, the page fault handler 46 proceeds to step 360.

In step 350, the page fault handler 46 has determined that the data for the particular extent 102 resides in the local physical memory 28. Accordingly, the page fault handler 46 sets the PTE for X as currently in use (i.e. sets its valid bit) and provides access to the data in physical memory 28. The latency for such access is relatively low (e.g., on the order of microseconds) since a "hit" has occurred on physical memory 28. Moreover, as long as the current computerized device 22 is the most recent device 22 to access the particular extent 102, the current computerized device 22 can continue to enjoy quick "re-hits" by simply re-accessing the extent 102 locally.

In step 360, the page fault handler 46 has determined that the data for the particular extent 102 resides in remote physical memory 28 on another device 22, and determines which device 22 is the current owner of the particular extent 102. Recall that all of the devices 22 are pre-configured to know all of the home nodes for all of the extents 102. Accordingly, if this device 22 discovers that itself is the home node for this extent 102 corresponding to SVM address X, then it can examine its own PTE(x) to determine which device 22 is the current owner. Otherwise, the page fault handler 46 sends an owner request 202 to the home node for the particular extent 102 corresponding to SVM address X (e.g., see the request message 202 sent from the device 22(A) to the device 22(B) for the extent Z in FIG. 4). In response to the owner request 202, the home node provides an owner response 204 which identifies the current owner of the particular extent 102 (e.g., see the owner response 204 sent from the device 22(B) back to the device 22(A) in FIG. 4).

In step 365, upon receipt of the owner response 204, the page fault handler 46 learns if the home node is the current owner or not. If it is, and the home node's response indicates it is not using the extent 102 (i.e., if the valid bit in the data response 204 is not set), then the page fault handler 46 knows that the home node has transferred ownership to it. Accordingly, the page fault handler 46 proceeds to step 370 where it retrieves the data in the particular extent 102 (e.g., using built-in RDMA provided by InfiniBand) from the home node and updates the PTE 44 in its own page table 42 to indicate that it is now the new current owner and that the extent is in use. Additionally, the home node automatically updates its PTE to indicate that the device 22 on which the page fault handler 46 is running is the new current owner.

Otherwise, the home node is not the current owner, but its response has indicated which device 22 is. The page fault handler 46 now knows the current owner of the particular extent 102, and proceeds to step 380.

In step 380, the page fault handler 46 sends a data request 206 to the device 22 which is identified as the current owner of the particular extent 102 (e.g., see the device 22(C) in FIG. 5). That device 22 will provide a data response 208 indicating whether it is still using the extent 102 (i.e., if the valid bit in the data response 208 is still set) and if it was the previous owner. If the identified device 22 indicates that the data is available (i.e., the valid bit in the data response 208 is not set), and it was the previous owner, then the page fault handler 46 knows its device is now the current owner and retrieves the data in the particular extent 102 (e.g., using built-in RDMA provided by InfiniBand) and updates the PTE 44 in its page table 42 to indicate that it is now the new current owner and that the extent is currently in use (e.g., also see FIGS. 6-7). The page fault handler 46 then proceeds to step 390.

In step 390, the page fault handler 46 informs the home node for the particular extent 102 that it is the new current owner. For example, the device 22(A) exchanges messages 214, 216 with the device 22(B) to inform the device 22(B) that the device 22(A) is the new current owner of extent Z in FIG. 7. At this point, the page fault handler 46 provides access to the data in the particular extent 102. Furthermore, as long as the current computerized device 22 is the most recent device 22 to access the particular extent 102, the current computerized device 22 can continue to enjoy quick "re-hits" by simply re-accessing the extent 102 locally. Further details will now be provided with reference to FIG. 9.

Figure 9:
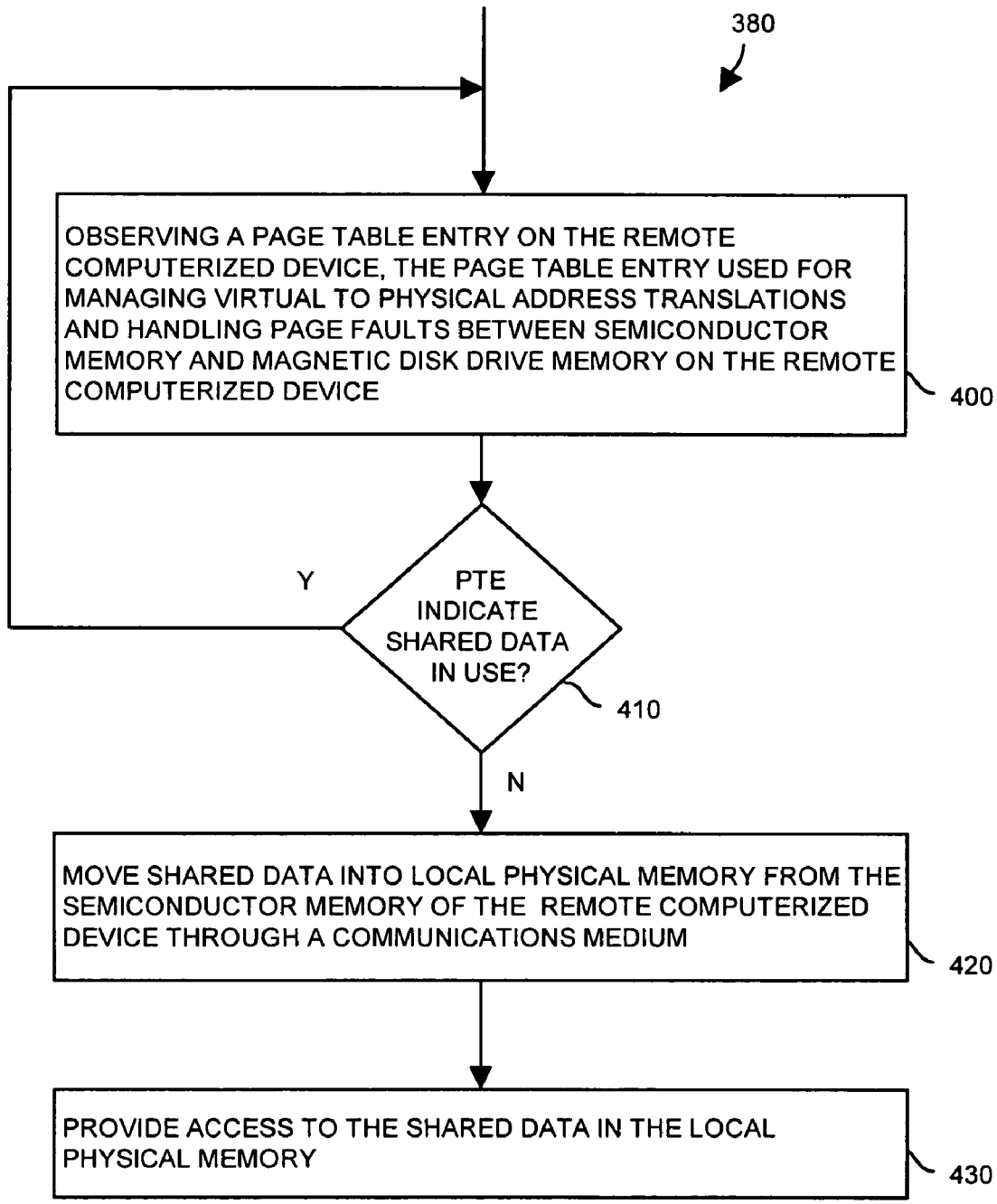
FIG. 9 is a flowchart illustrating operation for a data retrieval step of the procedure in FIG. 8.

FIG. 9 is a flowchart illustrating further details of the operation of the page fault handler 46 when performing step 380 of the procedure 300 in FIG. 8. Recall that, when beginning step 380, the page fault handler 46 now knows which device 22 currently owns the extent 102 containing the desired shared data (i.e., the extent 102 corresponding to SVM address X). Accordingly, in step 400, the page fault handler 46 observes a PTE 44 on the remote computerized device. In particular, the page fault handler 46 reads the PTE 44 for the SVM address X from the page table 42 of that device 22 (e.g., see the device 22(C) in FIG. 5).

In step 410, the page fault handler 46 determines whether it can obtain shared data from the remote computerized device 22 based on the observed PTE 44. In particular, if the valid bit (V) of the PTE 44 is set to valid (e.g., set to "V") rather than invalid (e.g., set to "I"), the remote computerized device 22 is denying access to the page fault handler 46. Accordingly, the page fault handler 46 repeats step 400 (i.e., the page fault handler 46 re-reads the remote PTE 44). If the valid bit (V) is set invalid, the page fault handler 46 proceeds to step 420.

Accordingly, the valid bit (V) of the PTE 44 essentially operates as an implicit lock for the extent 102. That is, the current owner device 22 (the device designated to be the current owner of the extent 102 by the home node of the extent 102) is capable of coordinating access to the extent 102 (locking and unlocking the extent 102) by simply managing the valid bit (V) of the PTE 44 to that extent 102. In particular, if the current owner device 22 sets the valid bit (V) to valid, the current owner device 22 effectively locks the extent 102 so that only the current owner device 22 can access the extent 102. However, if the current owner device 22 sets the valid bit (V) to invalid, the current owner device 22 effectively unlocks the extent 102 so that another device 22 can acquire ownership and access to the extent 102. As a result, there is no need for a program to provide an explicit lock instruction and no need for a separate short-term spinlock subsystem.

In step 420, the page fault handler 46 directs the current owner device 22 to relinquish ownership of the extent 102 and to provide the contents from that device's local physical memory 28. In response, the current owner device 22 updates its PTE 44 for the extent 102 within its page table 42 to reflect that it is no longer the current owner device 22 and provides the contents of the extent 102 through the communications medium 24 to the requesting device 22. This process is illustrated in FIGS. 5 and 6 where the device 22(C) updates metadata within PTE(x) (FIG. 5) to indicate that it is no longer the current owner (i.e., requesting device 22(A) is now the current owner) and then provides the contents of the extent 102 to device 22(A) (FIG. 6). The page fault handler 46 on the receiving device 22 (i.e., device 22(A) in FIG. 7) then moves the received shared data into its local physical memory 28 and updates its page table 42. In particular, the page fault handler 46 places the shared data into the extent 102 corresponding to PTE(x), sets the valid bit (V) of PTE(x) to valid and updates the remaining portion of PTE(x) to indicate that the data is now in extent Z (also see FIG. 7). The page fault handler 46 then proceeds to step 430.

In step 430, the page fault handler 46 provides access to the shared data in extent Z within the local physical memory 28. In particular, the application 52 can access the extent Z without fear that another device 22 will concurrently access extent Z due to extent Z being locked by an implicit lock, i.e., the valid bit (V) of PTE(x) being set to valid on the current owner device 22. When the application 52 is through accessing extent Z, the application 52 can clear the valid bit (V) thus unlocking extent Z so that other devices 22 can obtain access to the contents of extent Z in a similar manner.

It should be understood that since the valid bit (V) of PTE(x) is set to valid automatically by the page fault handler 46 and since the devices 22 are configured to view the valid bit (V) as the locking mechanism, there is no need for the application 52 to initiate an explicit instruction to obtain a lock for extent Z. Rather, the application 52 can simply rely on the enhanced page fault handler 46 to coordinate the shared memory access. Moreover, there is no need for a separate dedicated short-term spinlock mechanism as required by conventional shared memory systems. Further details will now be provided with reference to FIG. 10.

Figure 10:
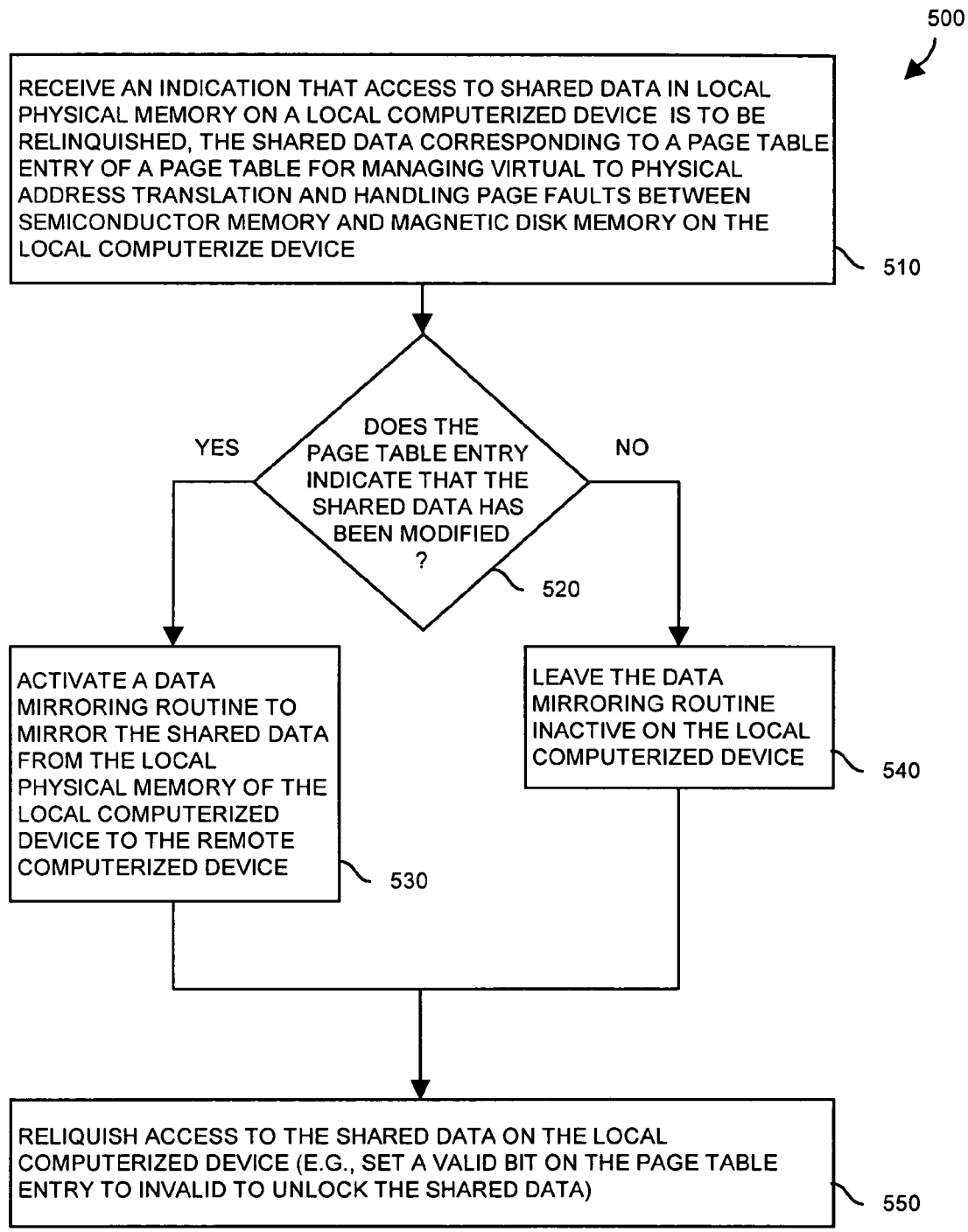
FIG. 10 is a flowchart of a data mirroring procedure performed by the system of FIG. 1.

FIG. 10 is a flowchart of a data mirroring procedure 500 which is performed by the controller 26 of each computerized device 22 when relinquishing access to shared data. For example, suppose that shared data is currently locked by the page fault handler 46 on a local computerized device 22 by setting the valid bit (V) of a page table entry 44 corresponding to the shared data. Just prior to relinquishing the lock on the shared data, the data mirroring procedure 500 can be performed by the page fault handler 46 to mirror the shared data to a mirroring device 22, i.e., another computerized device 22 which has been predefined as the mirroring device for the particular local computerized device 22. Such a procedure 500 protects the shared data since, in the event of a failure of the local computerized device 22, the shared data is still available on the mirroring device 22.

In step 510, the page fault handler 46 on the local computerized device 22 (e.g., see the computerized device 22(A) in FIGS. 4-7) receives an indication that access to the shared data in local physical memory 28 is to be relinquished. In particular, an application 52 provides an instruction that directs setting the valid bit (V) of a page table entry 42 corresponding to the shared data from "valid" (i.e., locked) to "invalid" (i.e., unlocked). Recall that, once the valid bit (V) is cleared (i.e., set to "invalid"), other computerized devices 22 will be able to access the shared data.

In step 520, the page fault handler 46 observes the page table entry 42. In particular, the page fault handler 46 inspects a modified bit (M) of the page table entry 42. If the modified bit (M) is set, the page table entry 44 indicates that the shared data has been altered (e.g., the application 52 has changed the shared data), and the page fault handler 46 proceeds to step 530. However, if the modified bit (M) is not set, the page table entry 44 indicates that the shared data is unaltered, and the page fault handler 46 proceeds to step 540.

In step 530, when the page table entry 44 indicates that the shared data has been modified, the page fault handler 46 activates a data mirroring routine to mirror the shared data from the local physical memory 28 of the local computerized device 22 (e.g., the device 22(A) in FIGS. 4-7) to a mirroring device 22 (e.g., the device 22(B)). In response, the data mirroring routing (e.g., a subroutine of the page fault handler 46, a subroutine called by the page fault handler 46, a library function, etc.) moves the shared data from the extent 102 within which the shared data currently resides (e.g., extent Z in device 22(A)) to the same extent 102 within the mirroring device 22 (e.g., extent Z in device 22(B)).

At this point, if the local computerized device 22 (e.g., device 22(A)) were to become unavailable (e.g., sustain a failure and shutdown, lose power, etc.), other computerized devices 22 (e.g., device 22(C) in FIGS. 4-7) within the shared memory system 20 would still be able to access the shared data. In particular, the other computerized devices 22 can obtain access to the shared data from the mirroring device 22 which has earlier been defined (e.g., prior to system operation) as the designated mirroring device 22 for the failed device 22. For instance, in the context of FIGS. 4-7, if the computerized device 22(A) does not respond to communications from requesting device 22(C) within a predetermined amount of time (i.e., if communications between the devices 22 times out), the requesting device 22(C) can then communicate with device 22(B) (i.e., the designated mirroring device 22 to device 22(A)) in order to obtain access to the shared data. As a result, the system 20 is capable of sustaining a failure (e.g., the loss of a device 22) but nevertheless remain operational and thus not lose any shared data. The page fault handler 46 clears the modified bit (M) of the page table entry 44 and then proceeds to step 550.

In step 540, since the shared data is unaltered, the page fault handler 46 simply leaves the data mirroring routine inactive on the local computerized device 22. That is, the page fault handler 46 does not call for transferring the shared data to the mirroring device 22 since the mirrored shared data on the mirroring device 22 already matches the shared data on the local computerized device 22. The page fault handler 46 then proceeds to step 550.

In step 550, the page fault handler 46 relinquishes access to the shared data on the local computerized device 22. In particular, in the context of a page table entry 42 which utilizes the valid bit (V) as a locking mechanism, the page fault handler 46 clears the valid bit (V) of the page table entry 44 corresponding to the shared data (i.e., sets the valid bit (V) to invalid). The shared data is now available for access by other devices 22 of the system 20. If a requesting device 22 is unable to access the shared data on the local computerized device 22 because the local computerized device 22 has failed, the requesting device 22 is capable of accessing the shared data from the device 22 which has been predefined as the mirroring device 22 to the failed device 22.

It should be understood that the above-described data mirroring routine was described in the context of a routine which is part of the page fault handler 46 by way of example. Other configurations are possible as well. For example, in other arrangements, the data mirroring routine is not part of the page fault handler 46 (e.g., the routine is invoked directly by an application 52 when it is ready to release a lock on the shared data).

It should be further understood that the above-described data mirroring technique is well-suited for use in the context of a shared virtual memory mechanism that provides sub-page-granular cache coherency. Such a mechanism is described in U.S. patent application Ser. No. 11/393,174, entitled "SUB-PAGE-GRANULAR CACHE COHERENCY USING SHARED VIRTUAL MEMORY MECHANISM" which has the same Assignee as the current Application and which was filed on even date herewith, the teachings of which are hereby incorporated by reference in their entirety.

It should be further understood that the above-described data mirroring technique is well-suited for use with an implicit locking mechanism. Such a mechanism is described in U.S. Pat. No. 7,409,525, entitled "IMPLICIT LOCKS IN A SHARED VIRTUAL MEMORY SYSTEM" which has the same Assignee as the current Application and which was filed on even date herewith, the teachings of which are hereby incorporated by reference in their entirety.

As mentioned above, an improved technique protects shared data by minoring modified shared data. In particular, when a page table entry 44 on a local computerized device 22 indicates that shared data corresponding to the page table entry 44 has been modified, the local computerized device 22 is capable of activating a data mirror routine to minor the shared data from local physical memory 28 on the local computerized device 22 to a remote computerized device 22 (e.g., a pre-defined minoring device). Accordingly, if the local computerized device 22 were to subsequently fail, the shared data is capable of being accessed from the remote computerized device 22. Such operation provides availability of the shared data in a simple and straightforward manner (e.g., in response to detection of a modified bit being set within the page table entry 44) but does not require dedicated and elaborate schemes to create replicate copies in different fault domains.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that InfiniBand and Rapid IO were described above as suitable protocols for handling communications between the devices 22 through the communications medium 24 because they offer off-the-shelf atomic access to the shared memory spaces on remote devices 22. Nevertheless, other protocols, hardware, software or a combination of both, that provide similar atomic masked compare and swap and RDMA features are suitable for use by the system 20 as well. Preferably, the external interfaces 30 (e.g., HCAs) of the devices 22 handle the atomic masked compare-and-swap and RDMA operations so that there is no operating system involvement required on the remote devices 22.

Additionally, it should be understood that the system 20 was described as having one pre-defined mirrored device 22 by way of example only. In other arrangements, the system 20 includes multiple predefined mirrored devices 22 (e.g., two, three, etc.) to provide enhanced availability for the shared data. Such modifications and enhancements are intended to belong to various embodiments of the invention.

What is claimed is:

1. In a local computerized device having local physical memory, a method for protecting shared data, the method comprising:
   observing a page table entry on the local computerized device, the page table entry being stored in a page table used for managing virtual to physical address translations, tracking page modifications and handling page faults between semiconductor memory and magnetic disk drive memory on the local computerized device;
   when the page table entry indicates that shared data corresponding to the page table entry has not been modified on the local computerized device, leaving a data mirror routine inactive on the local computerized device, the data mirror routine being configured to copy the shared data from the local physical memory to a remote computerized device; and
   when the page table entry indicates that shared data corresponding to the page table entry has been modified on the local computerized device, activating the data mirror routine to mirror the shared data from the local physical memory to the remote computerized device;
   wherein the local physical memory of the local computerized device includes a local non-mirror memory area and a local mirror memory area;
   wherein remote physical memory of the local computerized device includes a remote non-mirror memory area and a remote mirror memory area;
   wherein the local non-mirror memory area and the remote non-mirror memory area store different data to independently run, on the local and the remote computer devices, different applications performing different tasks over different fault domains in an ongoing manner;
   wherein the local mirror memory area and the remote mirror memory area maintain mirroring copies of the shared data to provide fault tolerant redundancy for the shared data across the different fault domains while the local and the remote computer devices independently run the different applications performing the different tasks over the different fault domains in the ongoing manner; and
   wherein the data mirror routine, in response to activation when the page table entry indicates that the shared data corresponding to the page table entry has been modified on the local computerized device, is constructed and arranged to (i) impose a lock on the shared data, (ii) perform a copy operation which copies the shared data from the local physical memory to the remote computerized device while concurrently maintaining the lock on the shared data, and (iii) release the lock after the copy operation is completed.

2. A method as in claim 1 wherein a computerized system is formed by multiple computerized devices which include the local computerized device and the remote computerized device; and wherein the method further comprises:
   pre-defining, for each computerized device of the multiple computerized devices forming the computerized system, another computerized device of the multiple computerized devices to operate as a mirror for shared data on that computerized device, the remote computerized device being configured to operate as a mirror for the shared data on the local computerized device.

3. A method as in claim 2, further comprising:
   suffering a failure which (i) prevents the local computerized device from providing access to the shared data on the local physical memory and (ii) enables access to the shared data on the remote computerized device, the shared data on the remote computerized device having been copied to the remote computerized device by the data mirror routine.

4. A method as in claim 2 wherein observing the page table entry includes:
   inspecting a modified bit to determine whether the shared data corresponding to the page table entry has been modified on the local computerized device, the modified bit indicating that the shared data (i) has not been modified when the modified bit is unasserted and (ii) has been modified when the modified bit is asserted.

5. A method as in claim 4 wherein activating the data mirror routine to mirror the shared data from the local physical memory to the remote computerized device includes:
   in response to a determination that the modified bit has been asserted, mirroring the shared data from the local physical memory to the remote computerized device.

6. A method as in claim 5 wherein the computerized system is formed by N computerized devices; wherein a page of the local physical memory is divided into Q extents; wherein the shared data resides in a particular extent of the Q extents; and wherein mirroring the shared data from the local physical memory to the remote computerized device includes:
   copying the shared data from the particular extent of the Q extents to a corresponding extent in physical memory of the remote computerized device.

7. A method as in claim 1 wherein the local mirror memory area includes (i) a first page storing first data which is updated by a first application running on the local computerized device and (ii) a second page storing second data which is updated by a second application running on the remote computerized device, the first and second applications running concurrently to perform at least some of the different tasks over the different fault domains in the ongoing manner.

8. A method as in claim 1, further comprising:
   running, on the local computerized device, a first application which writes and modifies shared data stored in the local mirror memory area, the data mirror routine mirroring the shared data from the local mirror memory area to the remote mirror memory area, the shared data which is mirrored by the data mirror routine from the local mirror memory area to the remote mirror memory area being initially protected against inadvertent modification by applications running on the remote computer device while the first application runs on the local computerized device.

9. A method as in claim 8, further comprising:
   in response to a failure of the local computerized device, running a second application on the remote computerized device, the second application being constructed and arranged to write and modify the shared data stored in the remote mirror memory area following the failure of the local computerized device.

10. A method as in claim 1, further comprising:
prior to imposing the lock on the shared data, receiving a write operation signal to perform a write operation to write the shared data to the local physical memory, the copy operation being performed in response to the write operation signal; and
only after the lock on the shared data is released, providing an output signal indicating successful completion of the write operation, the lock having been maintained on the shared data until the copy operation was been completed.

11. A method as in claim 10 wherein the page table includes (i) a first set of translations which, for the local non-mirror memory area, maps virtual page addresses to physical page addresses of the local non-mirror memory area, and (ii) a second set of translations which, for the local mirror memory area, maps virtual page addresses to physical extents of the local mirror memory area, each physical extent having an extent size which is less than a size of a page of the local computerized device to provide sparse page shared data storage; and
wherein performing the copy operation includes moving, as the shared data, data from a particular physical extent having the extent size which is less than the size of a page from the local physical memory to the remote computerized device.

12. A method as in claim 11 wherein observing the page table entry, leaving the data mirror routine inactive, and activating the data mirror routine are performed by a page fault handler which is constructed and arranged to further process page faults occurring in the local non-mirror memory area.

13. A computerized device, comprising:
local physical memory;
an internodal communications interface; and
a controller coupled to the local physical memory and to the internodal communications interface, the controller being constructed and arranged to:
observe a page table entry on the local computerized device, the page table entry being stored in a page table used for managing virtual to physical address translations, tracking page modifications and handling page faults between semiconductor memory and magnetic disk drive memory on the local computerized device,
when the page table entry indicates that shared data corresponding to the page table entry has not been modified on the local computerized device, leave a data mirror routine inactive on the local computerized device, the data mirror routine being configured to copy the shared data from the local physical memory to a remote computerized device, and
when the page table entry indicates that shared data corresponding to the page table entry has been modified on the local computerized device, activate the data mirror routine to mirror the shared data from the local physical memory to the remote computerized device;
wherein the local physical memory of the local computerized device includes a local non-mirror memory area and a local mirror memory area;
wherein remote physical memory of the remote computerized device includes a remote non-mirror memory area and a remote mirror memory area;
wherein the local non-mirror memory area and the remote non-mirror memory area store different data to independently run, on the local and the remote computer devices, different applications performing different tasks over different fault domains in an ongoing manner;
wherein the local mirror memory area and the remote mirror memory area maintain mirroring copies of the shared data to provide fault tolerant redundancy for the shared data across the different fault domains while the local and the remote computer devices independently run the different applications performing the different tasks over the different fault domains in the ongoing manner; and
wherein, in response to activation when the page table entry indicates that shared data corresponding to the page table entry has been modified on the local computerized device, the data mirror routine is constructed and arranged to (i) impose a lock on the shared data, (ii) perform a copy operation which copies the shared data from the local physical memory to the remote computerized device while concurrently maintaining the lock on the shared data, and (iii) release the lock after the copy operation is completed.

14. A computerized device as in claim 13 wherein a computerized system is formed by multiple computerized devices which include the local computerized device and the remote computerized device; and wherein the controller is further configured to:
pre-define, for each computerized device of the multiple computerized devices forming the computerized system, another computerized device of the multiple computerized devices to operate as a mirror for shared data on that computerized device, the remote computerized device being configured to operate as a mirror for the shared data on the local computerized device.

15. A computerized device as in claim 14 wherein the controller is further configured to:
suffer a failure which (i) prevents the local computerized device from providing access to the shared data on the local physical memory and (ii) enables access to the shared data on the remote computerized device, the shared data on the remote computerized device having been copied to the remote computerized device by the data mirror routine.

16. A computerized device as in claim 14 wherein the controller, when observing the page table entry, is configured to:
inspect a modified bit to determine whether the shared data corresponding to the page table entry has been modified on the local computerized device, the modified bit indicating that the shared data (i) has not been modified when the modified bit is unasserted and (ii) has been modified when the modified bit is asserted.

17. A computerized device as in claim 16 wherein the controller, when activating the data mirror routine to mirror the shared data from the local physical memory to the remote computerized device, is configured to:
in response to a determination that the modified bit has been asserted, mirror the shared data from the local physical memory to the remote computerized device.

18. A computerized device as in claim 17 wherein the computerized system is formed by N computerized devices; wherein a page of the local physical memory is divided into Q extents; wherein the shared data resides in a particular extent of the Q extents; and wherein the controller, when mirroring the shared data from the local physical memory to the remote computerized device, is configured to:
copy the shared data from the particular extent of the Q extents to a corresponding extent in physical memory of the remote computerized device.

19. A computerized device as in claim 13 wherein the local mirror memory area includes (i) a first page storing first data which is updated by a first application running on the local computerized device and (ii) a second page storing second data which is updated by a second application running on the remote computerized device, the first and second applications running concurrently to perform at least some of the different tasks over the different fault domains in the ongoing manner.

20. A computerized device as in claim 13 wherein the controller is further configured to:

run a first application which writes and modifies shared data stored in the local mirror memory area, the data mirror routine mirroring the shared data from the local mirror memory area to the remote mirror memory area, the shared data mirrored by the data mirror routine from the local mirror memory area to the remote mirror memory area being initially protected against inadvertent modification by applications running on the remote computer device while the first application runs on the local computerized device.

21. A computerized device as in claim 13 wherein the controller is further constructed and arranged to:

prior to imposing the lock on the shared data, receive a write operation signal to perform a write operation to write the shared data to the local physical memory, the copy operation being performed in response to the write operation signal, and only after the lock on the shared data is released, provide an output signal indicating successful completion of the write operation, the lock having been maintained on the shared data until the copy operation was been completed.

22. A computerized device as in claim 21 wherein the page table includes (i) a first set of translations which, for the local non-mirror memory area, maps virtual page addresses to physical page addresses of the local non-mirror memory area, and (ii) a second set of translations which, for the local mirror memory area, maps virtual page addresses to physical extents of the local mirror memory area, each physical extent having an extent size which is less than a size of a page of the local computerized device to provide sparse page shared data storage; and wherein performing the copy operation includes moving, as the shared data, data from a particular physical extent having the extent size which is less than the size of a page from the local physical memory to the remote computerized device.

\* \* \* \* \*